Figure 1:
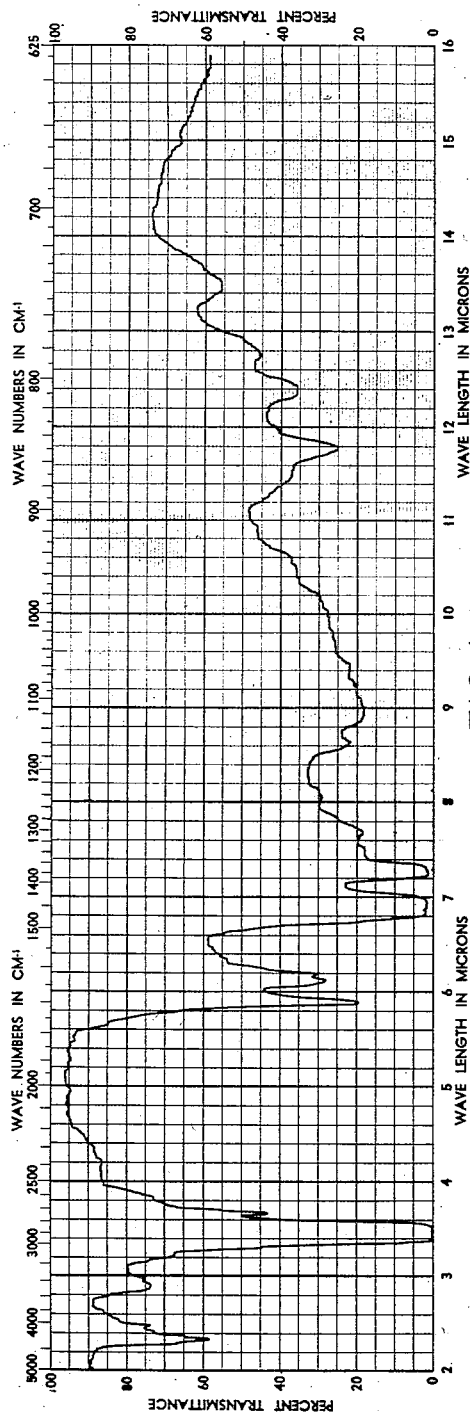

Sept 17, 1957 N. C. HILL 2,806,821

METHOD OF RECLAIMING RUBBER

Filed Dec. 7, 1951

2,806,821
Patented Sept. 17, 1957

2,806,821
METHOD OF RECLAIMING RUBBER

Norman C. Hill, Akron, Ohio; Ruth C. Hill, executrix of Norman C. Hill, deceased, assignor to The C. P. Hall Company, Akron, Ohio, a corporation of Ohio Application December 7, 1951, Serial No. 260,586

1 Claim. (Cl. 260—2.3)

The present invention relates to a new and useful process of reclaiming rubber consisting of natural rubber scrap or that mixed with GR–S scrap and/or scrap from polymers higher in styrene content than GR–S.

The reclaiming of scrap natural rubber or scrap from other polymers of the class of substances usually called rubber is a difficult task. There is no universal reclaiming agent, which when added to rubber or to said polymer gives a fine, high grade, reclaimed rubber. Each type of reclaim requires a specially prepared oil. It has to be "tailor made" to fit the accepted conditions of reclaiming in the particular plant with the specific equipment used in that plant.

To get the best reclaim one must consider many factors, and while this is not a dissertation on rubber reclaiming the factors are listed as variables to show the complexity of the problem.

I. Polymer scrap description
   A. The scrap polymer
        1. Its chemical composition as natural rubber or other polymer.
        2. Quantity of rubber hydrocarbon in the scrap.
        3. Its source and subsequent history; where used and for what purpose.
        4. Its degree of cure (hard, medium or soft).
        5. Its physical tests before reclaiming.
        6. Age of scrap.
        7. Materials admixed; cleanness, metal and other contamination; quantity of filler, softener and other admixtures.
   B. Size of scrap particles after cracking and grinding.
   C. Method of reclaiming to be employed.
   D. Where is reclaim to be used?
   E. What properties must the reclaim possess? Must it be smooth, tacky, sticky, live, dead, dry, etc.?
   F. Physical and chemical tests of reclaim.
        1. Specific gravity or density.
        2. Tensile strength after stated period of waiting.
        3. Tensile strength and other physical tests of a standard compound made with the reclaim.
        4. Percent rubber hydrocarbon.
        5. Percent acetone extract.
        6. Percent chloroform extract.

II. Reclaiming processes
Various and sundry methods of reclaiming the polymer scrap may be employed:
   A. Pan or open steam process.
   B. Digester processes.
        1. Alkali digestion.
        2. Neutral or zinc chloride process.
        3. Acid process.
        4. Hot water cook.
           a. Low pressure.
           b. High pressure.
   C. Mechanical processes.
        1. Hot roll process.
        2. Banbury reclaiming process.
        3. Extrusion reclaiming process.

III. Scrap source
The source of the scrap is also quite diversified. Some of the sources are:
   A. Passenger tires and recaps.
   B. Truck tires and recaps.
   C. Tire parts as tread, carcass, sidewall, etc.
   D. Inner tubes by source, type, and color.
   E. Bicycle tires.
   F. Shoes.
   G. Hose.
   H. Other mechanical types and grades.

All but one of the reclaiming processes listed herein require considerable oil, say 8–25 parts oil per 100 parts (by weight) of scrap. The process which requires less oil than the others is the high temperature hot water cook. Here a certain quantity of the rubber hydrocarbon is decomposed by the process itself, into an oil-like substance, hence less oil has to be added to the scrap. Here the added oil may be as low as 6%–10%. Since some of the oil added is vaporized during the blow-down operation other softening oils have to be added to avoid the unplasticized condition described by workers in this field as "dry." The use of higher molecular weight oils offsets this loss during the blow-down. The use of resins or resin forming oils also reduces the loss of oil during the process and assists in the reclaiming operation.

In all reclaiming operations except the mechanical processes, with the proper oil for a given type of scrap, the success of the operation depends largely upon the proper distribution of the oil. Every particle of scrap should have its quota of oil. If the scrap particles are mixed with the oil and the mixture is then heated to 50° or 60° C. the oil will be completely absorbed into the scrap particles so that each particle will thus have its proper share of oil. By heating the scrap and oil mixture for a short time the oil will have completely disappeared, that is, it will have been absorbed into the particle so that the oil cannot become separated from the scrap particles. Thus it is impossible to have one portion of the scrap dripping with excess oil while another portion of the scrap has little or no reclaiming oil. The type of mixer best suited for this work is a steam jacketed Pug Mill or a ribbon or double helical mixer, steam jacketed for heating the batch.

In reclaiming of elastomers such as rubber, synthetic rubber of the GR–S type, and those types which have a higher proportion of styrene, it is advisable to use a blend of oils, each oil having its particular purpose:

First—An oil which will cause swelling.
Second—An oil which will plasticize the resultant reclaim.
Third—A resin which will assist with plasticizing and will give body and tack to the finished reclaim.
Fourth—A reclaiming agent.

These substances may be added to the scrap separately or they may be added as a blend or by a process which incorporates both methods of addition. The preferred method is by addition of the blended oils.

As the amount of synthetic rubber in the scrap is increased, as compared to natural rubber, the amount of aromatic oil is preferentially increased to give the corresponding softening effect; still higher quantities of styrene in the polymer require more aromatic oils or more resins or more of the type of oils which polymerize to form resins under the conditions of the reclaiming operation.

The second and third types of oils listed above (plasticizers and resins) may be combined in one oil as for instance Para-Flux[®]. "Para-Flux[®]" is a product of The C. P. Hall Company of Akron, Ohio, and is described in United States Patent No. 1,611,436. It is also referred to in "Compounding Ingredients for Rubber,"

India Rubber World, New York, N. Y., page 120, and in Handbook of Material Trade Names, Industrial Research Service, 1946, page 326.

The oil which by its specific properties contains the reclaiming agent, which oil is the subject of this invention, is an oil which contains diolefins, which fact is substantiated by the reaction of said oil with maleic anhydride, indicating that the oil has conjugated double bonds. Ten grams of this oil, for instance, gives an exothermic reaction with 4 grams of maleic anhydride so that the temperature of the mass increases from 25° C. to 95° C. in one minute.

The infra red absorption spectrogram of this diolefinic oil is shown in Fig. 1. This spectrogram shows that the oil contains possibly cyclic structures or at least condensed structures, like tri-alkyl benzenes where the substituents are either short chains or longer chains with less than four (4) adjacent $CH_2$ molecular groupings between other substituents.

Figure 2:
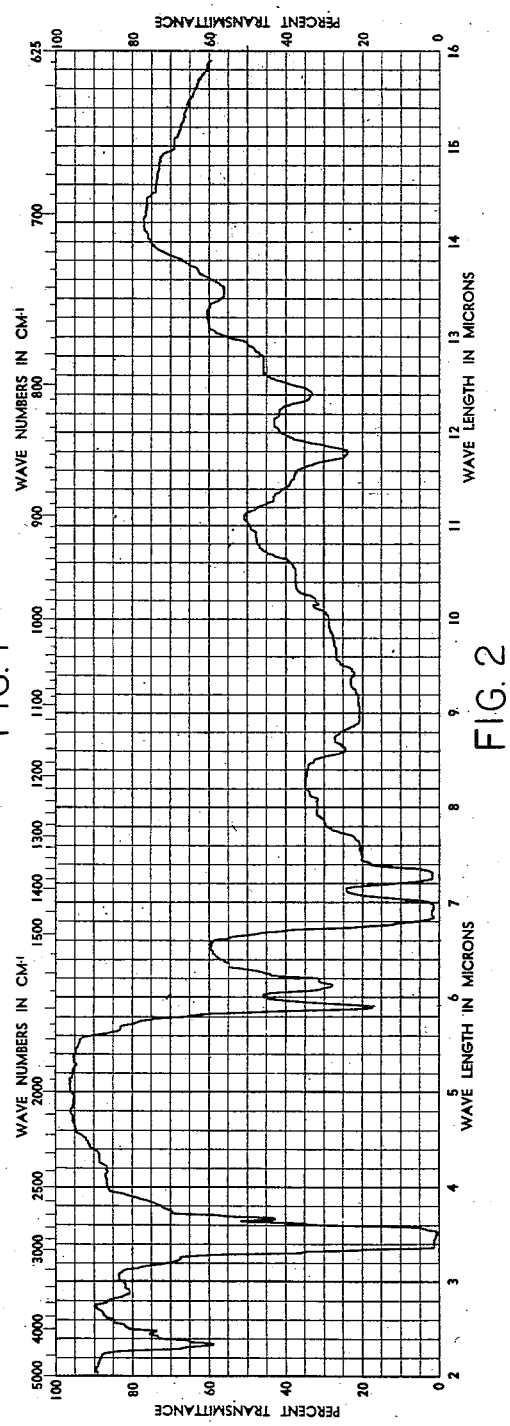

The infra red absorption spectrograms of three cuts made by distillation, as shown in Fig. 2, are identical, showing that the oil of different boiling points is essentially the same except for varying degrees of polymerization, that is the fractions 184° C. to 300° C., 300° C. to 380° C. and 380° C. and higher (Residue), when separated from the original oil by vacuum distillation give identical spectrograms. Comparing Fig. 2 with Fig. 1, almost identical curves are found showing that the vacuum distillation and related treatment did not affect the molecular structure.

The reclaiming oil described above and for which the infrared spectrograms are included as part of this specification, known as C. P. Hall Company Oil No. 4032, is produced by the polymerization of ethylene at controlled conditions of temperature and pressure with the aid of aluminum chloride as catalyst, dissolved in a chlorinated hydrocarbon solvent. Subsequent refining consists of flashing off the lighter solvent, hydrolyzing the excess catalyst ($AlCl_3$) and separating the water layer. The oil so produced has the following physical and chemical tests:

Specific gravity at 60° F./60° F. ___ 0.9094.
A. P. I. gravity at 60° F. _____ 24.1°.
Color _____ 6 N. P. A.
Flash _____ 170° F. minimum.
S. U. S. viscosity at 100° F. _____ 93 seconds.
Average molecular weight _____ 283.
Iodine Number (whole sample) _____ 311.

IODINE NUMBER DISTRIBUTION

| Fraction number | Boiling Point, ° C. | Percent of Whole Batch | Iodine Number |
|---|---|---|---|
| 1 | Below 170 | 0.2 | Not determined. |
| 2 | 170–200 | 2.1 | 394. |
| 3 | 200–250 | 19.5 | 338. |
| 4 | 250–300 | 16.0 | 296. |
| 5 | 300–320 | 12.1 | 232. |
| 6 | Above 320 | 49.9% Bottoms | 210. |

Index of refraction $n^D/25 = 1.5019$

Specific dispersion $\frac{n^G/25 - n^D/25}{\text{Density } 25/4° \text{ C.}} \cdot 10^4 = 200$

VACUUM ENGLER DISTILLATION

| Percent Over— | Still Temperature, ° C. | Corrected B P— 760 mm., ° C. |
|---|---|---|
| I. B. P. | 92 | 184 |
| 5 | 93 | 201 |
| 10 | 94 | 208 |
| 15 | 100 | 221 |
| 20 | 104 | 236 |
| 25 | 113 | 258 |
| 35 | 128 | 284 |
| 44 | 142 | 300 |
| 54 | 157 | 335 |
| 64 | 180 | 347 |
| 66 | 188 | 372 |
| 69 | 194 | 380 |
|  | Residue 31% | 380° C. plus |

The foregoing oil for which we have presented infra red spectrograms and which oil is identified as C. P. Hall Company Oil No. 4032 is not a good reclaiming oil when used alone for reclaiming scrap rubbers in which natural rubber is mixed with one or more types of synthetic rubbers. It contains a reclaiming agent and this oil is a resin former but it does not contain plasticizing oils. Additional oils as outlined previously in this specification are required to be admixed to do a good reclaiming job. For example 20% to 60% of oil No. 4032 should be used in conjunction with other oils to produce a reclaiming oil.

Several combinations which will conform to the foregoing specification are as follows:

*Example A*

| | Parts |
|---|---|
| High aromatic oil | 25 |
| Plasticizer oil | 25 |
| Resin oil and reclaiming agent (No. 4032 oil) | 50 |

*Example B*

For high styrene polymers an oil of this type is satisfactory.

| | Parts |
|---|---|
| High aromatic oil | 35 |
| Plasticizer oil | 25 |
| Resin oil and reclaiming agent (No. 4032 oil) | 40 |

The blends of oils covered by examples "A" and "B" where the plasticizer oil does not contain much color may be used advantageously as a reclaiming oil, where scrap of a particular color can be worked back into stock of that same color; thus white scrap may be reworked into white stock, red scrap may be reworked into red stock, buff scrap may be reworked into buff stock, etc., saving the value of the pigments employed. In operating under present conditions most of the foregoing colored scrap stocks are reworked into black stock thus losing the value of the white, red, buff and other pigments. The reworking of scrap back into the same colored stock applies on all of the processes recited under section II page 2, except the acid process or in other processes which cause discoloration of the scrap by the reclaiming operation itself.

Where it is not important to maintain the bright colors by using scrap back into the same colors and where carbon is used in the polymer the reclaiming oil blend may contain dark colored plasticizer oils and resin oils such as coal tar, selected asphalts, petroleum resins and resin bearing oils.

*Example C*

| | Parts |
|---|---|
| High aromatic oil | 15 |
| Plasticizer oils | 15 |
| Resin or resin bearing oils | 50 |
| Reclaiming agent (No. 4032 oil) | 20 |

For scrap which is higher in styrene content than GR-S the following blend might be used:

*Example D*

| | Parts |
|---|---|
| High aromatic oil | 25 |
| Plasticizer oils | 10 |
| Resin or resin bearing oils | 50 |
| Reclaiming agent (No. 4032 oil) | 15 |

While the oils, given as examples above do a good reclaiming job in the pan and digester processes, regardless of whether or not the stock is light colored or dark colored, these oils do a particularly good job in the mechanical reclaiming processes.

*Example E*

In Banbury reclaiming of scrap containing high styrene polymers 16% to 18% of the weight of scrap is the weight of Example "A" oil used.

The scrap containing say 25% rubber hydrocarbon with heavy clay loading, 20% to 30% Pliolite S-6 type polymer is first added to the Banbury unit. This is followed by the addition of the reclaiming oil. The Banbury unit is started at high speed and the ram is lowered and operated at 75 to 100 p. s. i. The temperature of the batch rises rapidly during mechanical working in the Banbury unit. These temperatures are shown below:

| Elapsed time, minutes: | Temperature, °F. | |
|---|---|---|
| 4 | 550. | |
| 4½ | 585. | |
| 5 | 578. | Turned on cooling water. |
| 5½ | 550. | Reduced speed. |
| 7 | 335. | |
| 7½ | 325. | Reclaimed rubber is dropped. |

The reclaimed rubber is usually dropped onto a mixing and cooling mill, next refined and the tailings (5% to 10%) are fed back (batch wise) into the Banbury for further reworking.

Four batches or more may be run per hour. The heat is developed by friction; most of the power consumed in the unit, driven by a 60 H. P. motor is converted into heat and the heat so developed is an important factor in this type of reclaiming. If too much oil is used the tensile test suffers. Where a softer scrap is reclaimed the quantity of oil may be reduced and the oil may be modified to suit the type of scrap used.

*Example F*

Where #1 peel ⅛" mesh was used, only 10% of reclaiming oil was required. The maximum temperature of 490° F. was employed with a ram pressure of 83 p. s. i. The reclaim so produced was rated as excellent.

*Example G*

Where dark colored scrap is being reclaimed by the pan or open steam process, oil described under Example C may be used if the scrap is soft. 12½ or 13% of oil (based on the weight of scrap) is required. If the scrap is tightly cured use 17% of oil.

Without previous experience with the particular scrap the foregoing percentages of oil are tried as "first approximations." If the steam pressure used on the devulcanizer is 150 p. s. i. then the first trials would be made at 4½, 5½ and 6½ hours. Based on the results secured from two or three experimental batches adjust the time to suit, keeping in mind that styrene polymers soften in a short time and then heat harden, while natural rubber continues to soften as time of reclaiming increases. Here it is necessary to select the time of reclaiming to be such that the softness of natural scrap and that of GR-S or other polymer scrap will be of the same degree of hardness so as not to have hard flecks of one polymer in a soft matrix of another polymer. Higher steam pressure calls for shorter time of heating and vice versa.

Extrusion reclaiming is practiced to some extent in the finishing operations of various other methods of reclaiming, that is, where all the reclaim produced by the other method is "strained" and then mixed on a roll before final refining.

In the use of the oils described in this application for extrusion reclaiming, it is felt desirable to first incorporate the oil into the particles of finely divided scrap by heating for the required time in the Pug Mill type agitator. With the addition of oil prior to actual reclaiming, followed by heating, swelling takes place accompanied by a partial softening. When the partially softened stock is fed into the extruder and it is worked at increased temperatures the hard portions of the scrap particles are broken down and thus reclaiming is accomplished. Oil of Example A type has been used for this purpose. In this process as in the other reclaiming processes the type and quantity of oil used must be fitted to the type of scrap being processed, the temperature employed, the mechanical work done, and other features already discussed.

What is claimed is:

In a process of reclaiming previously vulcanized rubber scrap composed of a substance selected from the group consisting of natural rubber and mixtures of natural rubber with rubbery copolymers of butadiene and styrene, the steps of contacting ground portions of said scrap with a reclaiming oil containing from 15 to 60 percent by weight of an oil produced by the polymerization of ethylene in the presence of $AlCl_3$ as a catalyst, said oil having well defined infrared absorption peaks at $5.9\mu$, $6.1\mu$, $6.2\mu$, $6.85\mu$, $6.92\mu$, $7.25\mu$, $9.0\mu$, $11.8\mu$, and $12.4\mu$, and heating said scrap and oil mixture to a temperature sufficiently high so that the oil will be absorbed into the scrap portions to an extent that the oil will not become separated from the scrap portions during subsequent reclaiming operations.

References Cited in the file of this patent

UNITED STATES PATENTS

| 2,183,154 | Sixt | Dec. 12, 1939 |
| 2,324,980 | Kilbourne | July 20, 1943 |
| 2,447,733 | Campbell | Aug. 24, 1948 |
| 2,471,496 | Randall | May 31, 1949 |
| 2,545,828 | Randall | Mar. 20, 1951 |
| 2,623,862 | Boyd | Dec. 30, 1952 |

OTHER REFERENCES

Rubber Age, February, 1946, pages 585–590.